United States Patent
Taylor

[15] 3,670,006
[45] June 13, 1972

[54] AMMOXIDATION OF SATURATED HYDROCARBONS

[72] Inventor: Keith M. Taylor, Ballwin, Mo.
[73] Assignee: Monsanto Company, St. Louis, Mo.
[22] Filed: Nov. 17, 1969
[21] Appl. No.: 877,468

[52] U.S. Cl. .................................................. 260/465.3
[51] Int. Cl. .................................................. C07c 121/02
[58] Field of Search ....................................... 260/465.3

[56] References Cited

UNITED STATES PATENTS 3,365,482  1/1968  Khoobiar ........................... 260/465.3
3,431,292  3/1969  Callahan et al. ................... 260/465.3

OTHER PUBLICATIONS

Shatalova, et al., C.A. 70 (Feb. 1969) p. 19531r

*Primary Examiner*—Joseph P. Brust
*Attorney*—Paul L. Passley, Richard W. Sternberg and Neal E. Willis

[57] ABSTRACT

Method for the production of acrylonitrile or methacrylonitrile from propane or isobutane employing a catalyst containing antimony, uranium and tungsten.

5 Claims, No Drawings

AMMOXIDATION OF SATURATED HYDROCARBONS

BACKGROUND OF THE INVENTION

This invention relates to the ammoxidation of saturated hydrocarbons to form unsaturated nitriles and particularly alpha, beta-unsaturated nitriles.

The value of unsaturated nitriles is generally recognized. Acrylonitrile is among the most valuable monomers available for producing polymeric products and particularly has value in the preparation of synthetic fibers, synthetic rubbers and other materials useful in the preparation of films, moldings and the like.

Many processes, catalytic and non-catalytic, are known and practiced for the manufacture of unsaturated nitriles. Most generally such nitriles are commercially obtained by the catalytic ammoxidation of unsaturated hydrocarbons in the vapor phase wherein an olefin is reacted with ammonia in the presence of oxygen and a catalyst. When producing acrylonitrile the olefin is propylene and when producing methacrylonitrile the olefin is generally isobutylene.

Saturated hydrocarbons, as a source of carbon, are lower in cost and are more abundant than unsaturated hydrocarbons or any other material useful as a starting material in the manufacture of unsaturated nitriles. Therefore, it is readily recognized that a feasible process for producing unsaturated nitriles directly from saturated hydrocarbons would be highly desirable commercially.

In the past, extensive work has been done in the development, particularly with regard to catalysts, of the ammoxidation of olefins and only recently has consideration been directed to the ammoxidation of saturated hydrocarbons to form unsaturated nitriles. However, the reported work in this latter area has not disclosed a commercially feasible process because the yield of unsaturated nitriles obtained is relatively low. For example, U.S. Pat. No. 3,365,482 discloses the use of molybdenum oxide and tungsten oxide as catalysts for the ammoxidation of saturated hydrocarbons to unsaturated nitriles. However, it is observed from this patent that the reported yield of acrylonitrile, based on the propane converted, is low. As pointed out in this patent and clearly recognized by the skilled artisan, many catalysts are known which with comparative ease effect the ammoxidation of unsaturated hydrocarbons to produce unsaturated nitriles but do not effect the ammoxidation of saturated hydrocarbons because the saturated hydrocarbons do not have a reactivity comparable to unsaturated hydrocarbons in the presence of the same catalysts to form unsaturated nitriles.

SUMMARY

This invention is directed to a vapor phase process wherein saturated hydrocarbons, particularly saturated acyclic hydrocarbons, are reacted with ammonia and oxygen in the presence of a catalyst containing antimony, uranium and tungsten to produce, at least in part, unsaturated nitriles and particularly alpha, beta-unsaturated nitriles. Particularly, this invention is directed to conversion of propane to acrylonitrile and isobutane to methacrylonitrile.

Accordingly, typical objects of this invention are to provide: (1) an improved vapor phase process for the production of unsaturated nitriles, (2) a vapor phase ammoxidation process for converting saturated hydrocarbons directly to unsaturated nitriles, (3) a vapor phase ammoxidation process for the production of acrylontrile directly from propane and, (4) a catalyst useful in the ammoxidation of saturated hydrocarbons.

Other objects, aspects and advantages of this invention will become apparent to those skilled in the art upon further study of this disclosure and the appended claims.

In accordance with this invention, in one aspect, saturated hydrocarbons, particularly paraffins, having from 3 to 12 carbon atoms per molecule, are ammoxidized directly in a one step process to unsaturated nitriles by a vapor phase reaction with ammonia and oxygen in the presence of a catalyst comprising antimony, uranium and tungsten. Generally, the metals are present in the catalyst as oxides, however, they may also be present as phosphates or sulfates, combinations of oxides, phosphates and sulfates, as complexes, or in any form leading to the above forms under reaction conditions.

The quantities of the metals employed in the catalyst of this invention effective in the conversion of saturated hydrocarbons to unsaturated nitriles are within an atomic ratio of antimony:uranium:tungsten of 1 to 99:1:1 to 10, preferably 1 to 25:1:1 to 5. The catalyst can be employed with or without a support. When used with a support, preferably the support comprises 10 to 90 percent by weight of the catalyst. Any known catalyst support material can be used, such as silica, alumina, zirconia, alundum, silicon carbide, silica-alumina, pumice and the inorganic phosphates, silicates, aluminates, borates and carbonates, stable under the reaction conditions encountered in the process in which the catalyst is used.

The metal oxides, phosphates, sulfates or the like can be formed separately and then blended or formed separately or together in situ or formed in pairs and then blended. As starting materials for the antimony component, for example, there can be used any antimony oxide, such as antimony trioxide, antimony tetroxide, and antimony pentoxide or mixtures thereof; or any antimony phosphate; or a hydrous antimony oxide, meta-antimonic acid, orthoantimonic acid, or pyroantimonic acid; or a hydrolyzable or decomposable antimony salt, such as an antimony halide, for example, antimony trichloride, trifluoride or tribromide; antimony pentachloride or antimony pentafluoride, which is hydrolyzable in water to form the hydrous oxide. Antimony metal can be employed with the hydrous oxide being formed by oxidizing the metal with an oxidizing acid such as nitric acid. The uranium component can be provided in the form of uranium oxide or by precipitation in situ from a soluble uranium salt such as the nitrate, acetate or a halide such as the chloride. Uranium metal can be used as a starting material, and if antimony metal is also employed, the antimony can be converted to the oxide and uranium to the nitrate simultaneously by oxidation in hot nitric acid. As starting materials for the tungsten component, for example, there can be used tungsten oxide, tungstic acid or a tungsten salt.

The activity of the catalyst system is enhanced by heating at an elevated temperature. Preferably the catalyst mixture is dried and heated at a temperature of from about 250° to about 650° C. for from 2 to 24 hours and then calcined at a temperature from about 700° to about 900° C. for from 2 to 24 hours.

The reactants in the process of this invention are saturated hydrocarbons, particularly saturated acyclic hydrocarbons, having from 3 to 12 carbon atoms per molecule, ammonia and oxygen. One or more saturated hydrocarbons may be employed as a reactant. The molar ratio of the reactants hydrocarbon: ammonia:oxygen employed in the process of this invention is in the range of 1:0.5:0.5 to 1:6:8 and preferably in the range of 1:1:1.5 to 1:3:4. The saturated hydrocarbon feed should be substantially free of unsaturated hydrocarbons for best conversion and optimum yield of the desired unsaturated nitrile. The present invention is, therefore, not to be confused with the developed art directed to olefin ammoxidation processes which unanimously teach that saturated hydrocarbons in the olefin feed are inert to the reaction and apparently serve as a diluent.

While ammonia is most generally employed as the nitrogen providing compound, other materials may be employed. For example, ammonia may be generated in use from decomposable ammonium compounds such as ammonium carbonate, or from various amines, such as methyl amine, ethyl amine and aniline. Any source of oxygen, pure or in admixture with inerts, may be employed in the process of this invention. Air is a satisfactory source of oxygen for use in this invention.

As previously stated, the process of this invention is carried out as a vapor phase reaction. Accordingly, any apparatus of the type suitable for carrying out oxidation reactions in the vapor phase may be employed for the practice of the process.

The process may be operated continuously or intermittently, and may employ a fixed bed with a large particulate or pelleted catalyst, or a so-called "fluidized" bed of catalyst with finely divided catalyst. The latter type is presently preferred for use with the process of this invention as it permits closer control of the temperature of the reaction.

The process of this invention is carried out at a temperature in the range of from about 300° C. to about 650° C. Preferably, the reaction is conducted at a temperature in the range of from about 375° C. to about 550° C.

Pressures other than atmospheric may be employed in the process of this invention, however, it will generally be preferred to conduct the reaction at or near atmospheric pressure, since the reaction proceeds well at such pressure and the use of expensive high pressure equipment is avoided.

The contact time between the reactants and catalyst employed in the process of this invention may be selected from a broad operable range which may vary from about 0.1 to about 50 seconds. The contact time may be defined as the length of time in seconds which the unit volume of reactant gases measured under reaction conditions is in contact with the volume of catalyst employed. The optimum contact time will, of course, vary depending upon the hydrocarbon being reacted, the catalyst and the reaction temperature. In the case of converting propane to acrylonitrile, the contact time will preferably be within the range of 0.5 to 20 seconds.

The reactor employed may be brought to the desired reactor temperature before or after the introduction of the vapors to be reacted. Preferably, the process is conducted in a continuous manner with the unreacted feed materials being recirculated. Also, the activity of the catalyst may be regenerated by contacting the catalyst with air at elevated temperatures.

The products of the reaction may be recovered from the effluent gas by any appropriate method and means known to the art and further elucidation here will be unnecessary duplication of the art.

DESCRIPTION OF PREFERRED EMBODIMENTS

The following Examples are given as illustrative of the invention and, as such, specifics presented therein are not intended to be unduly considered limitations upon the scope of this invention.

In the following Examples, the reactor used is a concentric tube system fabricated from 96 percent quartz tubing. The inner tube is one-half inch by 12 inch and the outer tube is 1 inch diameter. The reactor unit is supported in a vertical 1 inch tube furnace. Heat control of the reactor is accomplished by fluidizing Fisher "sea" sand in the shell side of the reactor unit. The reaction temperatures given in the Examples are measured by a thermocouple in the center of the reactor. Prior to entering the reactor, the reactant gases are mixed in standard Swagelock stainless steel "T's" and introduced into the bottom of the reactor through a coarse quartz fritted tube. The effluent gases from the reactor are chromatographically analyzed.

EXAMPLE I

This example illustrates the preparation of a catalyst comprising antimony and tungsten in an atomic ratio of Sb:W of 1:5.

A solution is prepared by mixing 25 grams of tungstic acid in 100 ml of ammonium hydroxide. To this solution is added 50 ml of 30 percent silica sol. To this mixture is added 6 grams of antimony pentachloride dropwise while the mixture is being stirred. The mixture is stirred and evaporated to near dryness and then dried in a vacuum oven at 110° C. for 16 hours. The dried catalyst is then calcined under air at 800° C. for 4 hours.

EXAMPLE II

This Example illustrates the preparation of a catalyst comprising antimony and tungsten in an atomic ratio of Sb:W of 1:1.

A solution is prepared by mixing 16 grams of tungstic acid in 100 ml of ammonium hydroxide. To this solution is added 50 ml of 30 percent silica sol. To this mixture is added 20 grams of antimony pentachloride dropwise while the mixture is being stirred. The mixture is stirred and evaporated to near dryness and then dried in a vacuum oven at 110° C. for 16 hours. The dried catalyst is then calcined under air at 800° C. for 4 hours.

EXAMPLE III

This Example illustrated the preparation of a catalyst comprising antimony, uranium, and tungsten in an atomic ratio of Sb:U:W of 5:1:5.

A mixture is prepared of 50 grams of a commercial antimony-uranium catalyst* having a nominal atomic ratio of 4.9 Sb:1U supported on silica and 17 grams of tungstic acid. The mixture is treated with 100 ml of ammonium hydroxide. The mixture is evaporated to near dryness and then dried in a vacuum oven at 155° C. The dried catalyst is then calcined under air at 800° C. for 20 hours.

EXAMPLE IV

This Example illustrates the preparation of a catalyst comprising antimony, uranium and tungsten in an atomic ratio of Sb:U:W of 5:1:1.

A mixture is prepared of 50 grams of the conventional antimony-uranium catalyst* (*A product of Girdler Catalysts Division of Chemetron Corporation identified as AN Catalyst 21 having a nominal atomic ratio of Sb:U of 4.91 supported on silica.) used in Example III and 3 grams of tungstic acid. The mixture is treated with 100 ml of ammonium hydroxide. The mixture is evaporated to near dryness and then dried in a vacuum oven at 155° C. for 16 hours. The dried catalyst is then calcined under air at 800° C. for 4 hours.

EXAMPLE V

This Example illustrates the preparation of a catalyst comprising antimony, uranium and tungsten in an atomic ratio of Sb:U:W of 8:1:8.

The catalyst is prepared by mixing 24.5 grams of antimony metal with 100 ml of nitric acid. The mixture is heated until evolution of nitrogen oxide stops. Separate solutions of 10.8 grams of uranyl acetate in 100 ml of water and 50 grams of tungstic acid in 150 ml of ammonium hydroxide are prepared. The uranyl acetate solution is added to the antimony solution and then the tungstic acid solution is added. The mixture is evaporated to near dryness and then dried in a vacuum oven at 110° C. for 16 hours. The dried catalyst is then calcined under air at 800° C. for 4 hours.

EXAMPLE VI

This Example illustrates the preparation of a silica supported tungsten catalyst.

A mixture is prepared of 30 grams of tungstic acid and 100 ml of ammonium hydroxide. This mixture is thoroughly mixed with 50 ml of 30 percent silica sol. The mixture is evaporated to near dryness and then dried in a vacuum oven at 110° C. for 16 hours. The dried catalyst is then calcined under air at 800° C. for 4 hours.

EXAMPLES VII

This Example illustrates the preparation of a catalyst comprising the oxides of antimony and uranium in an atomic ratio of Sb:U of 15:1.

A solution is prepared by dissolving 8 grams of uranyl acetate in 120 cc. of water. This solution is thoroughly mixed with 100 ml of 30 percent silica sol. To this mixture is added 67 grams of antimony pentachloride dropwise while the mixture is being stirred. Finally, 60 ml of ammonium hydroxide is stirred into the mixture. The mixture is evaporated to near dryness and then dried in a vacuum oven at 110° C. for 16 hours. The dried catalyst is then calcined under air at 800° C. for 5 hours.

EXAMPLE VIII

This Example illustrates the utility of the catalysts as prepared in the preceding Examples for converting propane directly to acrylontrile.

The feed to the reactor in each run consists of propane, ammonia and air. The volume ratio of propane:ammonia is 1:1.2 and propane:air is 1:12. The variables of reaction temperature, contact time and quantities of catalyst are shown in the following table which also gives the results of the reaction.

TABLE

| Contact time (sec.) | Reactor Temp., (° C.) | Propane [1] conversion, percent | Acrylonitrile Single pass [2] yield, percent | Acrylonitrile Ultimate [3] yield, percent |
|---|---|---|---|---|
| Catalyst: 1Sb:5W (Example I), 6.5 grams | | | | |
| 10 | 500 | 14.0 | 0.6 | 11.7 |
| Catalyst: 1Sb:1W (Example II), 4.4 grams | | | | |
| 10 | 500 | 9.8 | 1.6 | 16.7 |
| Catalyst: Mixture of 3.5 grams 5Sb:1U (conventional)* and 3.1 grams 1Sb:5W (Example I) | | | | |
| 10 | 500 | 15.8 | 11.9 | 75.3 |
| 15 | | 27.2 | 17.6 | 65.0 |
| 20 | | 55.2 | 25.5 | 46.0 |
| 5 | 550 | 40.7 | 22.3 | 54.8 |
| 1 | 600 | 57.1 | 13.0 | 22.7 |
| Catalyst: 5Sb:1U:5W (Example III), 9 grams | | | | |
| 15 | 500 | 22.3 | 8.7 | 39.2 |
| 20 | | 37.7 | 12.4 | 33.0 |
| 4 | 550 | 48.0 | 21.4 | 44.8 |
| 5 | | 79.7 | 19.8 | 25.3 |
| Catalyst: 5Sb:1U:1W (Example IV), 7.6 grams | | | | |
| 15 | 500 | 22.1 | 11.9 | 54.0 |
| 20 | | 28.4 | 12.7 | 44.7 |
| 2.5 | 550 | 23.2 | 14.1 | 60.7 |
| 4 | | 66.0 | 29.6 | 45.0 |
| 1 | 600 | 35.8 | 11.4 | 32.0 |
| Catalyst: 8Sb:1U:8W (Example V), 12.5 grams | | | | |
| 20 | 500 | 15.8 | 43.0 | 27.2 |
| 4 | 550 | 52.2 | 16.2 | 31.0 |
| 1 | 600 | 28.1 | 11.0 | 39.1 |
| Catalyst: W (Example VI), 8.4 grams | | | | |
| 15 | 500 | 28.0 | 3.0 | 10.6 |
| Catalyst: Mixture of 3.9 grams 5Sb:1U (conventional)* and 4 grams of W (Example VI) | | | | |
| 10 | 500 | 17.4 | 10.3 | 59.5 |
| 15 | | 41.4 | 12.4 | 30.1 |
| 20 | | 46.3 | 11.9 | 25.8 |
| 2.5 | 550 | 37.0 | 18.3 | 49.4 |
| 1 | 600 | 53.5 | 15.3 | 28.5 |
| Catalyst: Mixture of 2 grams 1Sb:1W (Example II) and 1.4 grams of 15Sb:1U (Example VII) | | | | |
| 15 | 500 | 37.7 | 20.8 | 55.4 |
| 20 | | 43.9 | 20.8 | 47.4 |
| 4 | 550 | 40.2 | 19.4 | 48.4 |
| 5 | | 65.3 | 14.7 | 22.6 |
| Catalyst: Mixture of 1 volume 15Sb:1U (Example VII) and 2 volumes of 1Sb:1W (Example II) | | | | |
| 10 | 500 | 20.1 | 10.8 | 54.0 |
| 15 | | 36.7 | 17.7 | 48.4 |
| 20 | | 58.3 | 19.2 | 32.9 |
| 2.5 | 550 | 25.8 | 8.9 | 34.5 |
| 4 | | 55.5 | 15.2 | 27.4 |

[1] Propane conversion percent=mols propane in feeds, mols propane in effluent×100 mols propane in feed.
[2] Acrylonitrile single pass yield percent=mols acrylonitrile in effluent× 100 mols propane in feed.
[3] Acrylonitrile ultimate yield percent=acrylonitrile single pass yield percent×100 propane conversion percent.
*A product of Girdler Catalysts Division of Chemetron Corporation identified as AN Catalyst 21 having a nominal atomic ratio of Sb:U of 4.9:1 supported on silica.

From the above Examples it is readily apparent that the catalyst of this invention exhibits an excellent combination of saturated hydrocarbons conversion and unsaturated nitrile selectively. It will also be noted that such results are obtained whether the catalyst is formed of antimony, uranium and tungsten components together or by blending an antimony-uranium catalyst with an antimony-tungsten catalyst or a silica supported tungsten catalyst.

The effectiveness of the process of this invention using the catalyst of this invention may be further improved both in regard to conversion of saturated hydrocarbons and selectivity toward unsaturated nitriles by the addition of halogens and/or halides to the catalyst and/or to reactants.

It will be obvious to persons skilled in the art that various modifications may be made in the improved catalyst and process as described in this application. Accordingly, it is intended that all such modifications which reasonably fall within the scope of the appended claims are included herein.

I claim:

1. A process for the preparation of acrylonitrile or methacrylonitrile which comprises reacting in the vapor phase at a temperature of from about 300° C. to about 650° C. a hydrocarbon consisting essentially of propane or isobutane, ammonia and oxygen in the presence of a catalyst consisting of, as the active catalytic ingredients, a mixture of the oxides of antimony, uranium and tungsten or a complex consisting of antimony, uranium, tungsten and oxygen or a combination of said oxides and said complex, the atomic ratio of antimony:uranium being from 1:1 to 20:1 and of tungsten: uranium being from 1:1 to 10:1, the molar ratio of hydrocarbon to ammonia to oxygen being from about 1:0.5:0.5 to about 1:6:8.

2. The process of claim 1 wherein said catalyst is carried on a catalyst support.

3. The process of claim 2 wherein said catalyst support is silica.

4. The process of claim 1 wherein said hydrocarbon is propane and acrylonitrile is produced.

5. The process of claim 1 wherein said hydrocarbon is isobutane and methacrylonitrile is produced.

* * * * *

UNITED STATES PATENT OFFICE
CERTIFICATE OF CORRECTION

Patent No. 3,670,006        Dated June 13, 1972

Inventor(s)   KEITH M. TAYLOR

It is certified that error appears in the above-identified patent and that said Letters Patent are hereby corrected as shown below:

Column 5, line 21, change "0.6" to --1.6--

Signed and sealed this 2nd day of January 1973.

(SEAL)
Attest:

EDWARD M. FLETCHER, JR.        ROBERT GOTTSCHALK
Attesting Officer              Commissioner of Patents